(12) United States Patent
Bang et al.

(10) Patent No.: US 9,088,033 B2
(45) Date of Patent: Jul. 21, 2015

(54) BATTERY PACK CONTAINING BATTERY CELL ARRAY ARRANGED IN LATERAL DIRECTION

(75) Inventors: Seunghyun Bang, Chungcheongbuk-do (KR); Youngsun Park, Cheongju-si (KR); Chunyeon Kim, Chungcheongbuk-do (KR); Ho Sang Kwon, Cheongju-si (KR)

(73) Assignee: LG CHEM, LTD., Seoul (KR)

( * ) Notice: Subject to any disclaimer, the term of this patent is extended or adjusted under 35 U.S.C. 154(b) by 372 days.

(21) Appl. No.: 13/520,130

(22) PCT Filed: Jan. 26, 2011

(86) PCT No.: PCT/KR2011/000537
§ 371 (c)(1),
(2), (4) Date: Aug. 1, 2012

(87) PCT Pub. No.: WO2011/093638
PCT Pub. Date: Aug. 4, 2011

(65) Prior Publication Data
US 2012/0300396 A1  Nov. 29, 2012

(30) Foreign Application Priority Data
Feb. 1, 2010 (KR) .................. 10-2010-0009167

(51) Int. Cl.
*H01M 10/46* (2006.01)
*H01M 2/10* (2006.01)
*H01M 2/34* (2006.01)

(52) U.S. Cl.
CPC .............. *H01M 2/1077* (2013.01); *H01M 2/34* (2013.01)

(58) Field of Classification Search
CPC ........ H02J 7/0013; H02J 7/355; H02J 7/0042

USPC ......... 320/107, 110, 112, 116, 117, 132, 134, 320/136, 150; 429/96, 97, 98, 99, 100
See application file for complete search history.

(56) References Cited

U.S. PATENT DOCUMENTS

2005/0042511 A1  2/2005  Kaneta
2006/0115719 A1  6/2006  Jeon et al.
(Continued)

FOREIGN PATENT DOCUMENTS

JP  2006-156392 A  6/2006
JP  2007-18746 A  1/2007
(Continued)

OTHER PUBLICATIONS

International Search Report for PCT/KR2011/000537 mailed on Sep. 15, 2011.

*Primary Examiner* — Edward Tso
(74) *Attorney, Agent, or Firm* — Birch, Stewart, Kolasch & Birch, LLP (57) ABSTRACT

Disclosed herein is a battery pack including a battery cell array including three or fewer battery cells, each of which has an electrode assembly of a cathode/separator/anode structure disposed in a battery case together with an electrolyte in a sealed state, arranged in the lateral direction, the battery cells having a current capacity of 3 amperes (Ah) or more and being electrically connected in series to each other, a protection circuit module (PCM) connected to the upper end of the battery cell array to control the operation of the battery pack, the protection circuit module including a protection circuit, from which a function to adjust voltage unbalance between the battery cells is removed, and a pack case in which the battery cell array and the protection circuit module are disposed.

15 Claims, 11 Drawing Sheets

(56) References Cited

U.S. PATENT DOCUMENTS

| | | |
|---|---|---|
| 2006/0177733 A1 | 8/2006 | Ha et al. |
| 2007/0009794 A1 | 1/2007 | Takami et al. |
| 2008/0081249 A1 | 4/2008 | Kaneko |
| 2008/0299445 A1* | 12/2008 | Nagasawa et al. ............... 429/86 |
| 2009/0220853 A1* | 9/2009 | Yang et al. .................... 429/159 |
| 2010/0015514 A1 | 1/2010 | Miyagi et al. |
| 2010/0151299 A1 | 6/2010 | Ha et al. |
| 2010/0297482 A1* | 11/2010 | Yoon et al. ...................... 429/61 |

FOREIGN PATENT DOCUMENTS

| | | |
|---|---|---|
| JP | 2007-18881 A | 1/2007 |
| JP | 2007-194209 A | 8/2007 |
| JP | 2008-41292 A | 2/2008 |
| JP | 2008-521199 A | 6/2008 |
| KR | 10-2008-0025429 A | 3/2008 |
| KR | 10-2009-0000292 A | 1/2009 |
| KR | 10-2009-0037769 A | 4/2009 |
| WO | 03/103074 A1 | 12/2003 |

* cited by examiner

BATTERY PACK CONTAINING BATTERY CELL ARRAY ARRANGED IN LATERAL DIRECTION

TECHNICAL FIELD

The present invention relates to a high capacity battery pack, and, more particularly, to a battery pack including a battery cell array including three or fewer battery cells arranged in the lateral direction, the battery cells having a current capacity of 3 amperes (Alt) or more and being electrically connected in series to each other, a protection circuit module (PCM) connected to the upper end of the battery cell array to control the operation of the battery pack, the protection circuit module including a protection circuit, from which a function to adjust voltage unbalance between the battery cells is removed, and a pack case in which the battery cell array and the protection circuit module are disposed.

BACKGROUND ART

Various kinds of combustible materials are contained in a secondary battery. As a result, the secondary battery may be heated or explode due to overcharge of the secondary battery, overcurrent in the secondary battery, or other physical external impact applied to the secondary battery. That is, the safety of the secondary battery is very low. Consequently, safety elements, such as a positive temperature coefficient (PTC) element and a protection circuit module (PCM), to effectively control an abnormal state of the secondary battery, such as overcharge of the secondary battery or overcurrent in the secondary battery, are disposed on a battery cell in a state in which the safety elements are connected to the battery cell.

Meanwhile, a battery pack for laptop computers is configured to have a structure in which several battery cells having relatively low capacity are connected in series or parallel to each other due to technical and equipment-based limits of the secondary battery and low safety and yield of the secondary battery, thereby providing a desired capacity to the battery pack.

In recent years, battery packs for laptop computers configured to have 2 parallel (P)-2 series (S), 2P-3S, and 2P-4S structures have been developed. Such battery packs provide various capacities ranging from approximately 28 Wh to approximately 90 Wh.

That is, it is difficult to manufacture a high capacity battery cell due to technical limits of the battery cell constituting a battery pack. For this reason, several low capacity battery cells (for example, 2.5 amperes) are connected to provide a desired capacity to the battery pack.

Figure 1:
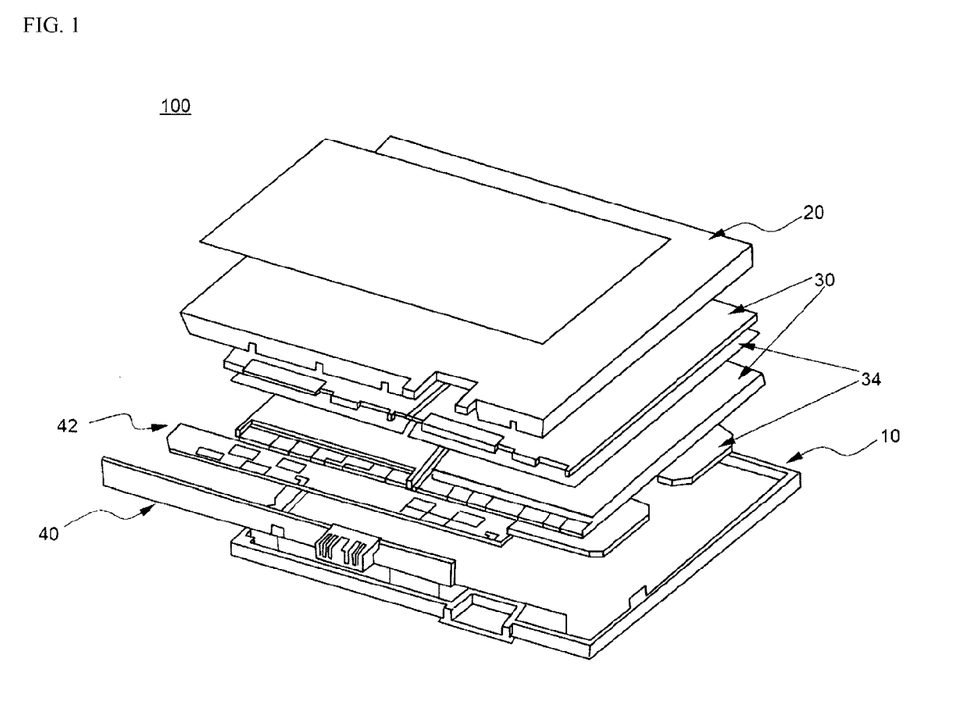
FIG. 1 is an exploded view showing a conventional battery pack having a 2P-2S structure.

For example, FIG. 1 is an exploded view typically showing a conventional battery pack having a 2P-2S structure.

Referring to FIG. 1, a conventional battery pack 100 is configured so that four battery cells 30 are electrically connected to each other in a 2P-2S structure. A protection circuit module 40 and a flexible protection circuit board (FPCB) 42 are connected to the upper ends of the battery cells to control the operation of the battery pack.

Also, double-sided adhesive tapes 34 are provided between the battery cells 30 and between the battery cells 30 and a lower case 10. The battery cells 30, the protection circuit module 40, the flexible protection circuit board 42 are sealed by an upper case 20 and the lower case 10.

In addition, the protection circuit module 40 includes an additional element (not shown) to adjust voltage unbalance between the battery cells due to series electrical connection between the battery cells.

In the above battery pack structure, however, cell voltage unbalance between the battery cells connected in parallel to each other must be considered during the operation of the battery pack since the battery cells are connected in parallel to each other, which complicates the design of the protection circuit. Also, costs related to addition of parts constituting the circuit are increased, and therefore, costs necessary to manufacture the battery pack are increased. Furthermore, a battery pack defect rate is increased due to cell voltage unbalance exceeding a malfunction and allowance range of the protection circuit.

In the battery pack manufacturing technology as described above, low capacity battery cells are connected to each other to manufacture the battery pack. Consequently, wiring for series and parallel connection between the battery cells is complicated due to the increase in number of the battery cells, which complicates assembly of the battery pack with the result that productivity is lowered, and a defect rate based on poor assembly of the battery pack during production is increased.

Therefore, there is a high necessity for a battery pack having a specific structure that can provide high capacity without parallel connection between battery cells.

Meanwhile, a battery pack mounted in a laptop computer requires high power and capacity. To this end, a conventional cylindrical battery pack including a plurality of cylindrical battery cells has generally been used. In recent years, however, the size of a laptop computer has been reduced, and therefore, there is a high necessity for a slim type battery pack.

Therefore, there is a high necessity for a technology that is capable of using high capacity pouch-shaped battery cells to manufacture a slim type battery pack, thereby increasing overall current capacity of the battery pack.

DISCLOSURE

Technical Field

Therefore, the present invention has been made to solve the above problems, and other technical problems that have yet to be resolved.

Specifically, it is an object of the present invention to provide a high capacity battery pack that can be manufactured without using a parallel connection structure and, at the same time, greatly reduce a defect rate due to voltage unbalance between battery cells when the battery cells are connected in parallel to each other.

It is another object of the present invention to provide a high capacity battery pack, which is manufactured using a simple and easy method and the number of parts of which is reduced, thereby reducing manufacturing costs.

Technical Field

In accordance with one aspect of the present invention, the above and other objects can be accomplished by the provision of a battery pack including (a) a battery cell array including three or fewer battery cells, each of which has an electrode assembly of a cathode/separator/anode structure disposed in a battery case together with an electrolyte in a sealed state, arranged in the lateral direction, the battery cells having a current capacity of 3 amperes (Ah) or more and being electrically connected in series to each other, (b) a protection circuit module (PCM) connected to the upper end of the battery cell array to control the operation of the battery pack, the protection circuit module including a protection circuit, from which a function to adjust voltage unbalance between the battery cells is removed, and (c) a pack case in which the battery cell array and the protection circuit module are disposed.

The battery pack according to the present invention includes the battery cells each having a current capacity of 3 amperes or more. Consequently, the battery pack according to the present invention uses three or fewer battery cells as compared with a conventional battery pack for laptop computers including four or more battery cells each having a current capacity of 2.5 amperes, and therefore, it is possible to assemble the battery pack using a simpler method.

Also, the battery cells are electrically connected in series to each other. Consequently, it is possible to reduce a battery pack defect rate due to voltage unbalance between the battery cells as compared with a conventional battery pack for laptop computers including battery cells electrically connected in parallel to each other.

In addition, parallel electrical connection between the battery cells is not used. Consequently, it is possible to remove a cell voltage unbalance correction function, one of the functions performed by the protection circuit to prevent voltage unbalance between the battery cells electrically connected in parallel to each other. As a result, it is possible to simplify the design of the protection circuit and to reduce the number of the circuit parts, thereby greatly reducing battery pack manufacturing costs.

The series electrical connection between the battery cells is not particularly restricted so long as parallel electrical connection between two or more battery cells is not included. Preferably, the battery cells are electrically connected in series to each other in a 1 parallel (P)-2 series (S) structure or in a 1P-3S structure.

The series electrical connection structure is achieved using three or fewer battery cells. Consequently, it is possible to manufacture a high capacity battery pack having a more compact structure.

The battery pack may further include a spacer mounted between the pack case and the battery cell array to provide a space accommodating the increase in thickness of the battery cell array during charge and discharge of the battery pack.

Consequently, it is possible to provide a space accommodating the increase in thickness of the battery cell array during charge and discharge of the battery pack while uniformalizing the thickness of the pack case by the spacer mounted between the pack case and the battery cell array, thereby minimizing the overall increase in weight and size of the battery pack.

In addition, it is possible to uniformalize the thickness of the pack case as compared with a conventional battery pack structure in which the thickness of the pack case is locally reduced, thereby minimizing defects during injection molding.

According to the results of experiments carried out by the inventors of the present application, the thickness of a secondary battery after 300 to 500 cycles of charge and discharge of the secondary battery is 5 to 10% greater than the thickness of the secondary battery before charge and discharge of the secondary battery. For this reason, the spacer may have a thickness equivalent to 5 to 10%, preferably 7 to 8%, of the thickness of the battery cell array so as to offset the increase in thickness of the secondary battery.

In a preferred example, the pack case may be formed of a plastic material, and the spacer may be formed of a sheet Member or a plastic material.

Consequently, the pack case according to the present invention can reduce the weight of the battery pack and can be easily applied to complex products as compared with a pack case formed of a metal material.

The sheet member may be formed of, preferably, a Nomex material. For reference, Nomex is a trademark of a product manufactured and sold by El du Pont de Nemours and Company.

Meanwhile, the spacer is provided at the top or bottom thereof with an adhesive, by which the spacer is bonded to the outer side of the battery cell array. Consequently, it is possible to effectively prevent the spacer from moving out of position. Alternatively, the spacer may be formed of a double-sided adhesive tape.

The spacer may be mounted to the tops and bottoms of the battery cells at two or more edges thereof in a state in which the spacer has a predetermined width. In this structure, the spacer may have a width equivalent to 5 to 20% of the width of each of the battery cells.

If the width of the spacer is less than 5% of the width of each of the battery cells, the spacer may be damaged since the width of the spacer is narrow. On the other hand, if the width of the spacer is greater than 20% of the width of each of the battery cells, a space to offset the increase in thickness of the battery cell array becomes insufficient, which is not preferable.

In a preferred example, the spacer may be a strip member.

In another preferred example, the spacer may be formed to have a lattice structure in which the spacer is simultaneously mounted to the battery cells in a state in which the tops or bottoms of the battery cells are exposed.

Meanwhile, the protection circuit module may include connection terminals connected to electrode terminals of the battery cells by resistance welding, metal plates to electrically connect the battery cells to each other, and a protection circuit to control the operation of the battery pack.

In a preferred example of the above-mentioned structure, the metal plates to electrically connect the battery cells to each other may be formed at the top of the protection circuit module. In this structure, it is possible to easily manufacture the PCM and to easily assemble the battery pack as compared with a conventional battery pack structure in which metal wires are formed at a layer in the protection circuit of the PCM so as to electrically connect battery cells to each other.

In another preferred example of the above-mentioned structure, electrical connection regions between cathode terminals of the battery cells and the protection circuit module may be configured to have a structure in which conductive plates attached to tops of the respective connection terminals of the protection circuit module are welded so that the conductive plates wrap the respective cathode terminals of the battery cells.

In the battery pack with the above-stated construction, therefore, the connection terminals of the protection circuit module and the cathode terminals of the battery cells are directly connected to each other with high welding coupling force via the conductive plates, which are configured to have a specific structure, and the battery cells are electrically connected in series to each other via the metal plates included in the protection circuit module. Consequently, it is possible to easily manufacture a high capacity battery pack through the use of a simple method.

For example, in a case in which a battery pack is constituted by three battery cells, the battery cells are arranged in the lateral direction to constitute a battery cell array, the battery cell array and a PCM are disposed at a pack case, and electrode terminals of the battery cells and connection terminals of the PCM are connected to each other by resistance welding, thereby manufacturing a desired battery pack.

Specifically, the conductive plates may be attached to the connection terminals of the protection circuit module so that the conductive plates can be bent, the conductive plates may be bent in a bracket shape in a state in which the cathode terminals of the battery cells are placed on the conductive plates, and resistance welding may be carried out from above the bent portions of the conductive plates, thereby achieving physical coupling and electrical connection between the connection terminals of the protection circuit module and the cathode terminals of the battery cells.

The shape of the conductive plates is not particularly restricted so long as the conductive plates can be easily bent. For example, the conductive plates may be formed in an L shape in a state in which the conductive plates are attached to the corresponding connection terminals of the protection circuit module.

Each of the conductive plates may include a first connection part attached to the top of a corresponding one of the connection terminals of the protection circuit module and a second connection part attached to the top of the cathode terminal of a corresponding one of the battery cells. Consequently, the connection between the cathode terminals of the battery cells and the connection terminals of the protection circuit module is more securely achieved. In addition, when external force is applied to the battery pack, deformation of the electrical connection regions between the cathode terminals of the battery cells and the protection circuit module is prevented.

The material composing each of the conductive plates is not particularly restricted so long as the conductive plates can provide high coupling force when the conductive plates are welded as described above. Preferably, each of the conductive plates is a nickel plate, and each of the cathode terminals of the battery cells is an aluminum terminal.

Consequently, electric current from a resistance welding rod during resistance welding between the nickel plate and the aluminum terminal flows from the nickel plate, resistance of which is high, to the aluminum terminal, resistance of which is low, with the result that the resistance welding between the nickel plate and the aluminum terminal is easily achieved.

Preferably, the pack case includes a lower case, at which the battery cell array and the protection circuit module are disposed, and an upper case to cover the lower case so as to fix the battery cell array and the protection circuit module in place.

The lower case may be partitioned into a battery cell mounting part, at which the battery cells are disposed, and a protection circuit module mounting part, at which the protection circuit module is disposed, and a partition wall may be formed at the interface between the battery cell mounting part and the protection circuit module mounting part. Also, openings, through which electrode terminals of the battery cells are exposed toward the protection circuit module, may be formed at portions of the partition wall corresponding to electrical connection regions between the electrode terminals of the battery cells and the protection circuit module.

In this pack case structure, it is possible to restrain contact between the electrode terminals of the battery cells and the parts of the protection circuit module since the partition wall is formed at the interface between the battery cell mounting part and the protection circuit module mounting part. Also, even when an electrolyte leaks from one or more of the battery cells, the electrolyte is prevented from flowing to the protection circuit module, thereby preventing the occurrence of a short circuit.

Also, since the openings, through which the electrode terminals of the battery cells are exposed toward the protection circuit module, are formed at portions of the partition wall corresponding to the electrical connection regions between the electrode terminals of the battery cells and the protection circuit module, it is possible to easily weld the electrode terminals of the battery cells, which are exposed through the openings, to the connection terminals of the protection circuit module.

The height of the partition wall may be sufficient to fully isolate the battery cell mounting part and the protection circuit module mounting part from each other.

The protection circuit module mounting part may be configured to have a structure including support parts to support the electrical connection regions between the electrode terminals of the battery cells and the protection circuit module.

The shape of the support parts is not particularly restricted so long as the support parts can easily support the electrical connection regions between the electrode terminals of the battery cells and the protection circuit module. For example, the support parts may be formed on the lower case in the shape of an upward protrusion.

Preferably, the support parts are formed in the shape of a cross-shaped protrusion. Consequently, it is possible for the support parts to more stably support the electrical connection regions between the electrode terminals of the battery cells and the protection circuit module during resistance welding between the electrode terminals of the battery cells and the protection circuit module.

In the battery pack according to the present invention, any battery cells may be used in various manners irrespective of the kind and shape of the battery cells. A pouch-shaped secondary battery of an approximately hexahedral structure having a small thickness to width ratio, preferably a pouch-shaped lithium secondary battery, may be used as each battery cell of the battery pack.

According to circumstances, an external input and output terminal, which inputs electric current to the battery pack, outputs electric current from the battery pack, and transmits and receives information, may be mounted at the front of the protection circuit module in a depressed form.

In this structure, the battery pack can be stably connected to an external device through the external input and output terminal since the external input and output terminal is configured to have a connector structure.

In accordance with another aspect of the present invention, there is provided a laptop computer including the battery pack with the above-stated construction as a power source.

However, the battery pack according to the present invention may be manufactured so as to provide power and capacity required by a device by varying the number of battery cells constituting the battery pack. Of course, therefore, the battery pack according to the present invention can be applied to various devices requiring variable battery capacities in addition to the laptop computer.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 2:
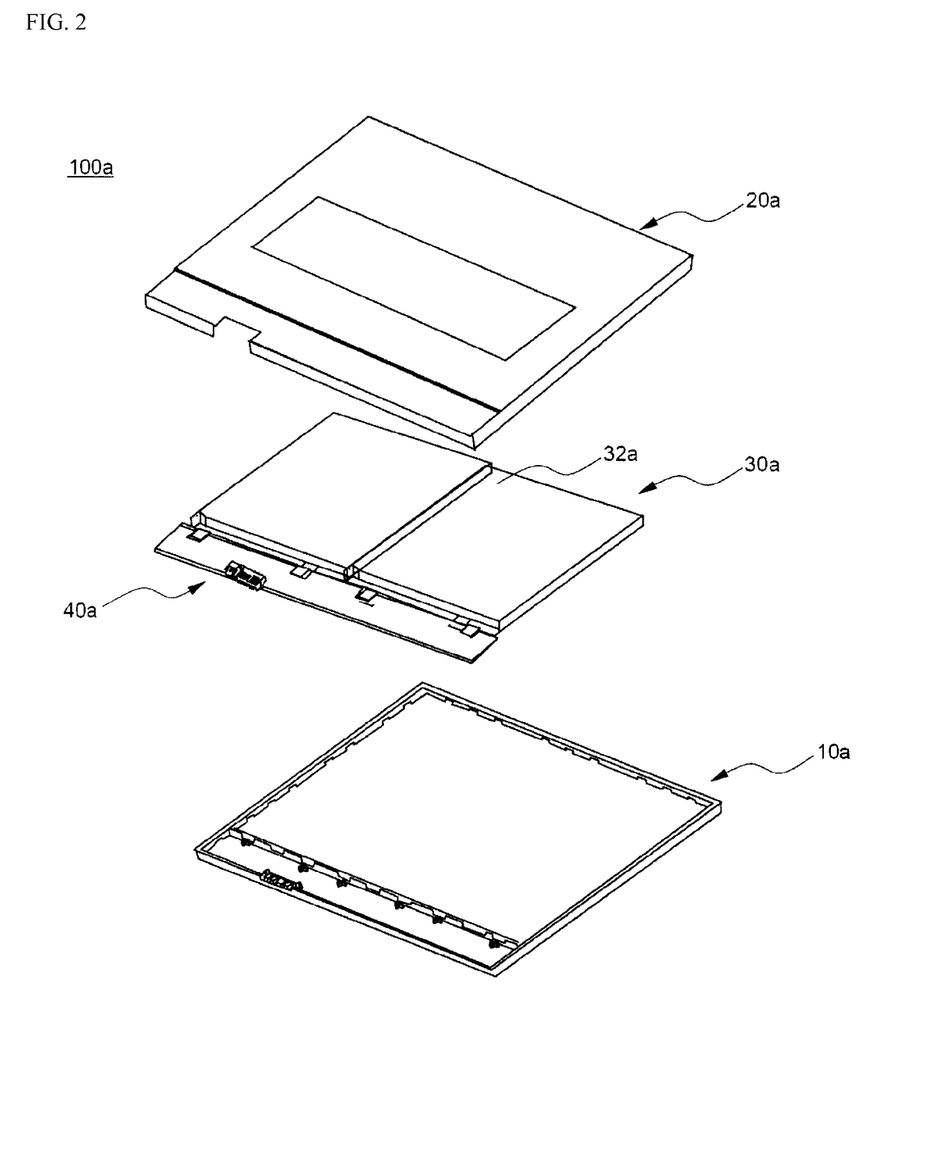
FIG. 2 is an exploded view showing a battery pack according to an embodiment of the present invention.

FIG. 2 is an exploded view typically showing a battery pack according to an embodiment of the present invention.

Referring to FIG. 2, a battery pack 100a includes a battery cell array 30a including two battery cells 32a, having a current capacity of 3 amperes, arranged in the lateral direction in a state in which the battery cells 32a are electrically connected in series to each other, a protection circuit module 40a connected to the upper end of the battery cell array 30a, and pack cases 10a and 20a between which the battery cell array 30a and the protection circuit module 40a are disposed.

The protection circuit module 40a includes a protection circuit, from which a function to adjust voltage unbalance between the battery cells is removed.

Each of the battery cells 32a is a pouch-shaped secondary battery configured so that an electrode assembly having a cathode/separator/anode structure is disposed in a battery case together with an electrolyte in a sealed state. The pouch-shaped secondary battery is generally configured to have a plate-shaped structure, i.e. an approximately hexahedral structure having a small thickness to width ratio. Generally, the pouch-shaped secondary battery includes a pouch-shaped battery case. The battery case is configured to have a laminate sheet structure in which an outer coating layer formed of a polymer resin exhibiting high durability, a barrier layer formed of a metal material blocking moisture or air, and an inner sealant layer formed of a polymer resin that can be thermally welded are sequentially stacked.

The pack cases include a lower case 10a to which the battery cell array 30a and the protection circuit module 40a are mounted and an upper case 20a disposed above the lower case 10a to fix the battery cell array 30a and the protection circuit module 40a in place.

Figure 3:
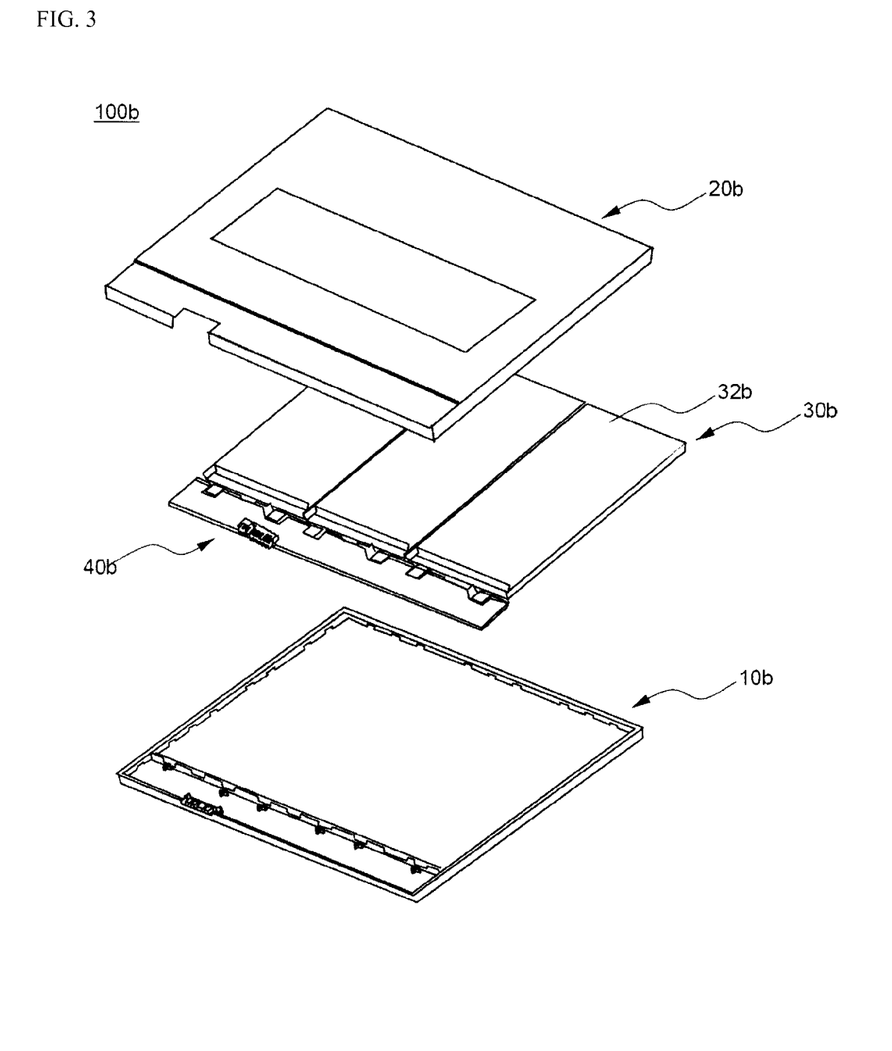
FIGS. 3 and 4 are exploded views showing battery packs according to other embodiments of the present invention.
Figure 4:
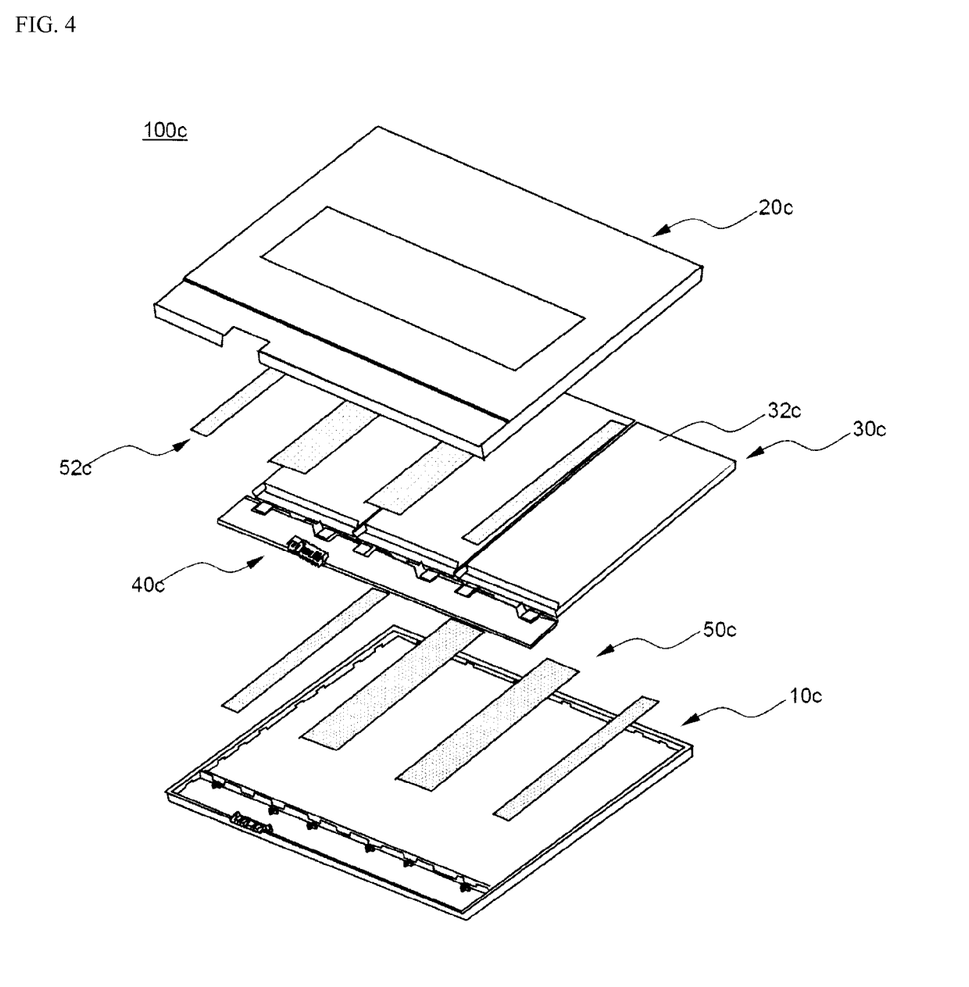

FIGS. 3 and 4 are exploded views typically showing battery packs according to other embodiments of the present invention.

Referring first to FIG. 3, a battery pack 100b of FIG. 3 is identical in structure to the battery pack 100a of FIG. 2 except that three battery cells 32b are electrically connected to series to each other, and therefore, a detailed description thereof will not be given.

Referring to FIG. 4, in a battery pack 100c of FIG. 4, an upper case 20c and a lower case 10c are formed of a plastic material, and spacers 50c and 52c are formed of a double-sided adhesive tape, such as Nomex.

The spacers 50c and 52c include an upper spacer 52c mounted to the top of a battery cell array 30c and a lower spacer 50c mounted to the bottom of the battery cell array 30c. Each of the spacers has a thickness equivalent to approximately 8% of the thickness of each battery cell 32c.

Figure 5:
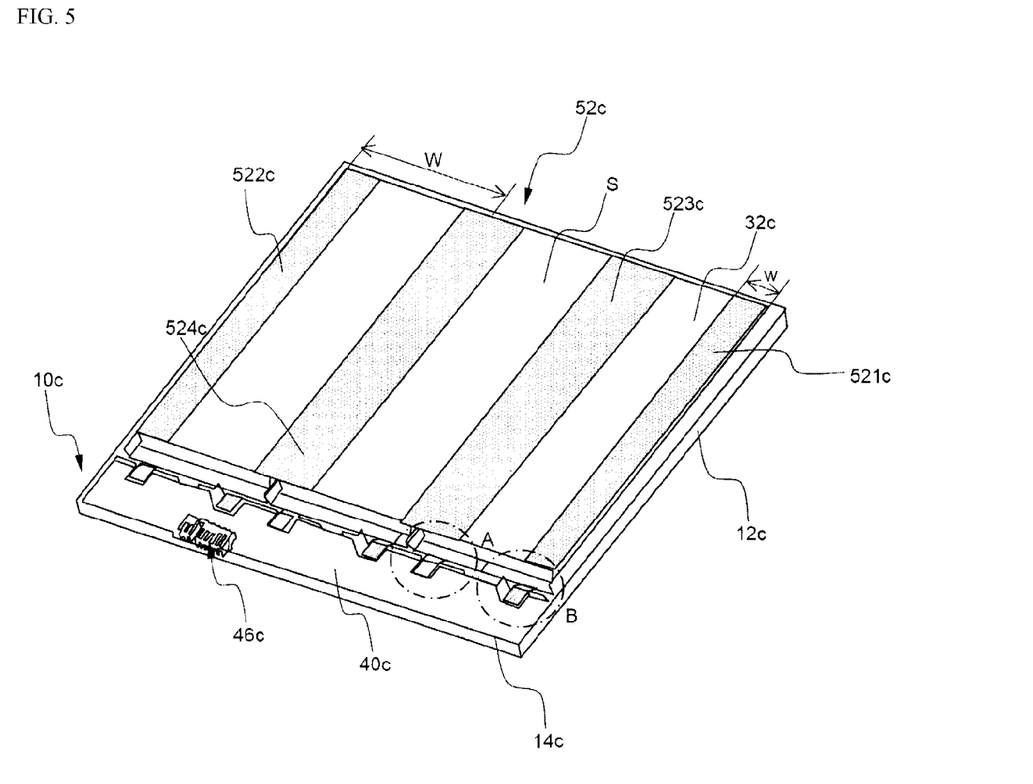
FIG. 5 is a perspective view showing a structure in which a spacer is mounted to the upper end of a battery cell array of FIG. 4.

FIG. 5 is a perspective view typically showing a structure in which the spacer is mounted to the upper end of the battery cell array of FIG. 4.

Referring to FIG. 5, the upper spacer 52c includes first upper spacers 523c and 524c, each of which has a width w equivalent to approximately 20% of the width W of each of the battery cells 32c, and second upper spacers 521c and 522c, each of which has a width w equivalent to approximately 10% of the width W of each of the battery cells 32c.

Consequently, the thickness of the battery cells 32c increased during charge and discharge of the battery cells 32c is offset in spaces S between the first upper spacers 523c and 524c and the second upper spacers 521c and 522c. As a result, overall thickness of the battery pack does not change.

Also, the first upper spacers 523c and 524c and the second upper spacers 521c and 522c are mounted to the tops of the corresponding battery cells 32c at two edges thereof. The first upper spacers 523c and 524c and the second upper spacers 521c and 522c are formed in the shape of an elongated strip.

Figure 6:
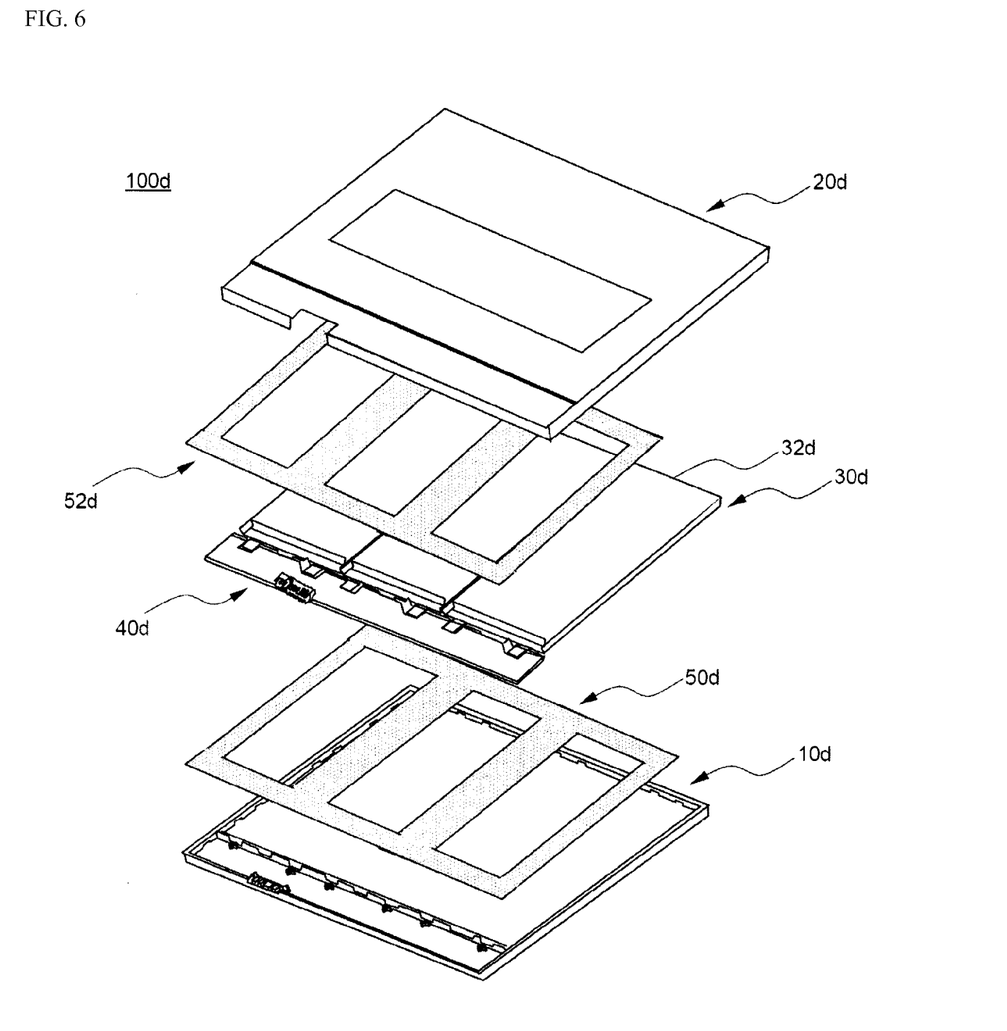
FIG. 6 is an exploded view showing a battery pack according to a further embodiment of the present invention.
Figure 7:
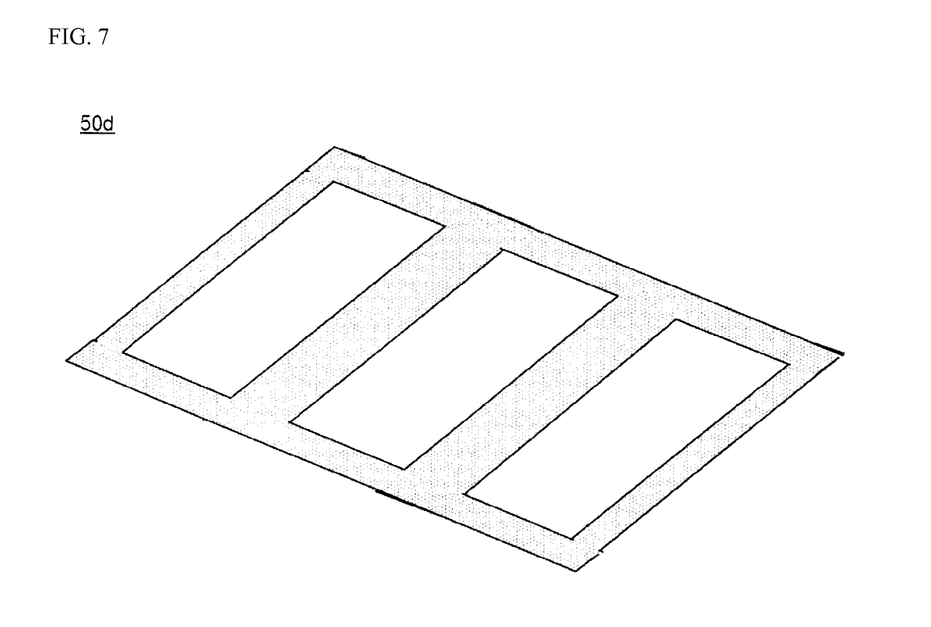
FIG. 7 is an enlarged view typically showing a spacer of FIG. 6.

FIG. 6 is an exploded view typically showing a battery pack according to a further embodiment of the present invention, and FIG. 7 is an enlarged view typically showing a spacer of FIG. 6, Referring to these drawings, spacers 50d and 52d are mounted to the tops and bottoms of battery cells 32d at four edges thereof. The spacers 50d and 52d are formed to have a lattice structure in which the spacers 50d and 52d are simultaneously mounted to the battery cells 32d in a state in which the tops or bottoms of the battery cells 32d are exposed.

Figure 8:
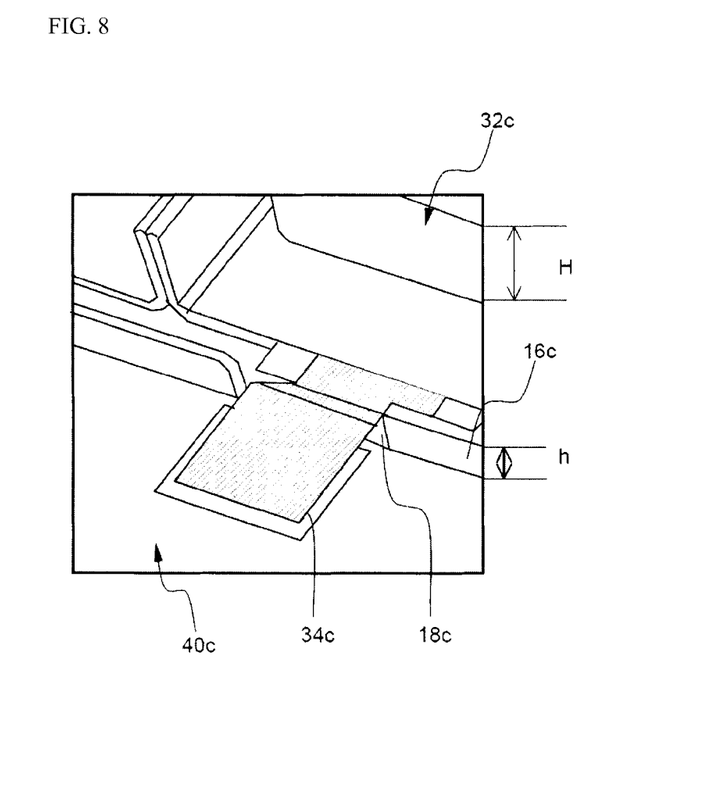
FIG. 8 is an enlarged view typically showing a region A of FIG. 6.
Figure 9:
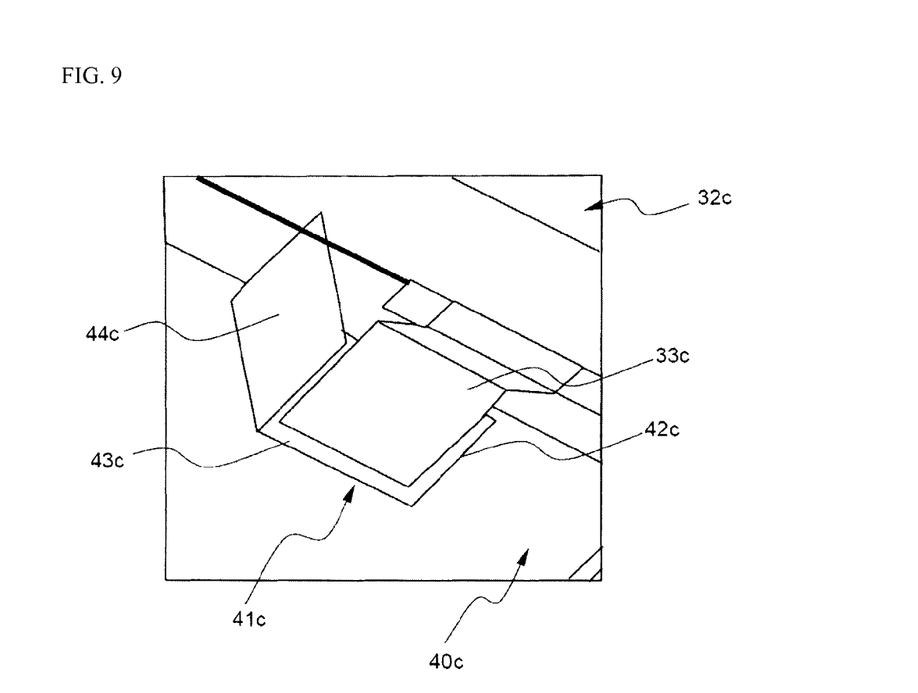
FIG. 9 is an enlarged view typically showing a region B of FIG. 6.

FIG. 8 is an enlarged view typically showing a region A of FIG. 5, and FIG. 9 is an enlarged view typically showing a region B of FIG. 5.

Referring to these drawings together with FIG. 5, the lower case 10c is partitioned into a battery cell mounting part 12c, at which the battery cells 32c are disposed, and a protection circuit module mounting part 14c, at which the protection circuit module 40c is disposed.

A partition wall 16c is formed at the interface between the battery cell mounting part 12c and the protection circuit module mounting part 14c. Openings 18c, through which anode terminals 34c of the battery cells 32c are exposed toward the protection circuit module 40c, are formed at portions of the partition wall 16 corresponding to electrical connection regions between the anode terminals 34c of the battery cells 32c and the protection circuit module 40c.

The partition wall 16c has a height h sufficient to fully isolate the battery cell mounting part 12c and the protection circuit module 40c from each other. According to circumstances, a corresponding partition wall may be formed at the upper case (not shown) so as to achieve the above-mentioned isolation.

The protection circuit module 40c includes connection terminals 42c connected to cathode terminals 33c of the battery cells 32c by resistance welding, metal plates (not shown) to electrically connect the connection terminals 42c to each other, and a protection circuit (not shown) to control the operation of the battery pack.

An electrical connection region B between the cathode terminal 33c of each of the battery cells 32c and the protection circuit module 40c is configured to have a structure in which a conductive plate 41c attached to a corresponding one of the connection terminals 42c of the protection circuit module 40c wraps the cathode terminal 33c of each of the battery cells 32c.

Also, the conductive plate 41c, which may be a nickel plate, includes a first connection part 43c attached to the top of the corresponding connection terminal 42c of the protection circuit module 40c and a second connection part 44c attached to the top of the cathode terminal, which may be an aluminum terminal, of the corresponding battery cell 32.

Specifically, the conductive plate 41c is attached to the top of the corresponding connection terminal 42c of the protection circuit module 40c in an L shape. The conductive plate 41 is bent in a bracket shape in a state in which the cathode terminal 33c of the corresponding battery cell 32c is placed at the top of the first connection part 43c of the conductive plate 41c, and then resistance welding is carried out from above the second connection part 44c, which is a bent portion of the conductive plate 41c.

Meanwhile, an external input and output terminal, i.e. a connector 46c, which inputs electric current to the battery pack, outputs electric current from the battery pack, and transmits and receives information, is mounted at the front of the protection circuit module 40c in a depressed form.

Figure 10:
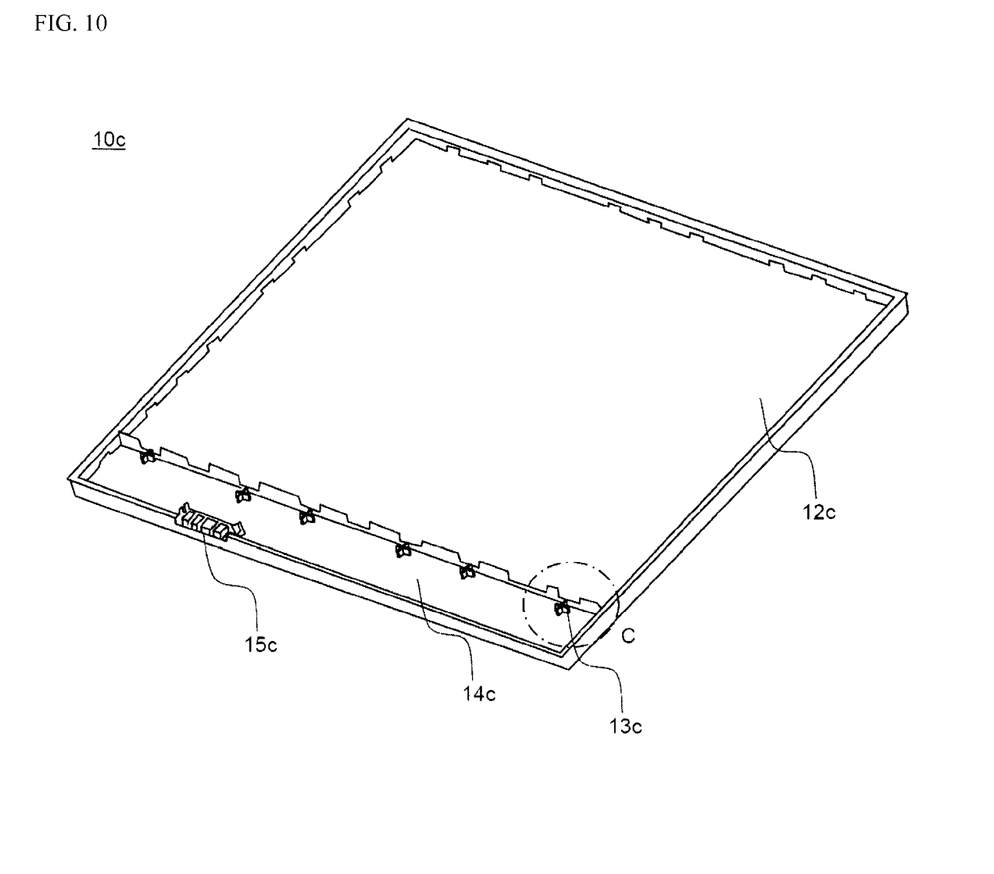
FIG. 10 is a perspective view of a lower case.
Figure 11:
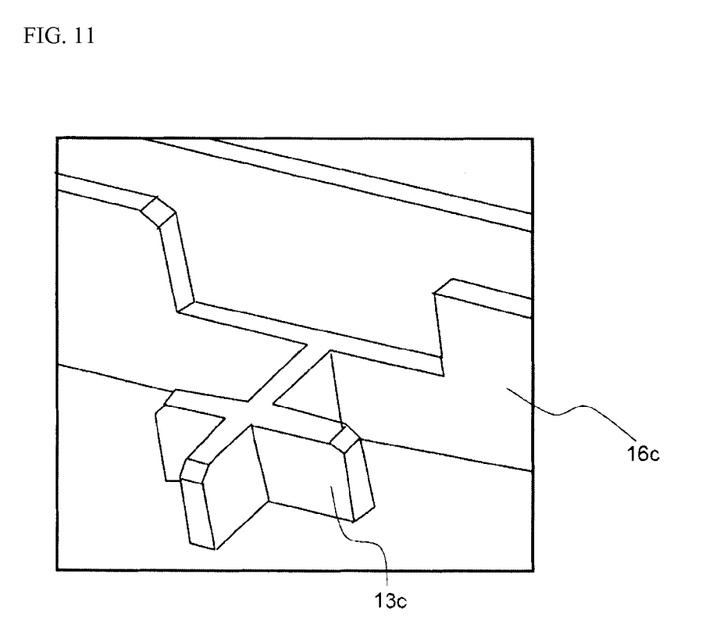
FIG. 11 is an enlarged view typically showing a region C of FIG. 10.

FIG. 10 is a perspective view typically showing the lower case, and FIG. 11 is an enlarged view typically showing a region C of FIG. 10.

Referring to these drawings together with FIGS. 5 and 9, an external input and output terminal mounting part 15c, in which an external input and output terminal 46c, which inputs electric current to the battery pack, outputs electric current from the battery pack, and transmits and receives information, is mounted, is formed at the protection circuit module mounting part 14c of the lower case 10c.

Also, a support part 13c to support the electrical connection region between the cathode terminal 33c of each of the battery cells 32c and the protection circuit module 40c is formed on the lower case 10c in the shape of an upward cross-shaped protrusion in a state in which the support part 13 is connected to the partition wall 16c. The support part 13 appropriately supports downward pressure applied by a welding tip (not shown) to be located above the cathode terminal 33c of each of the battery cells 32 during resistance welding, thereby providing high welding force.

Figure 12:
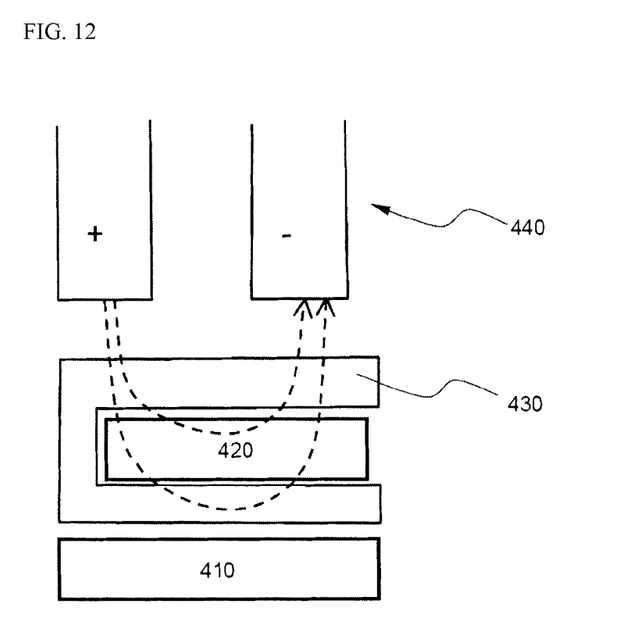
FIG. 12 is a typical view showing a resistance welding structure of the present invention.

FIG. 12 is a typical view showing a resistance welding structure of the present invention.

Referring to FIG. 12, electric current generated from a resistance welding rod 440 during resistance welding between a nickel plate 430, located at the top of a protection circuit board 410, and an aluminum terminal 420 flows from the nickel plate 430, resistance of which is high, to the aluminum terminal 420, resistance of which is low, and flows back to the nickel plate 430. At this time, heat is generated from the interface between the aluminum terminal 420 and the nickel plate 430 due to resistance difference therebetween with the result that the resistance welding between the nickel plate 430 and the aluminum terminal 420 is easily achieved.

Figure 13:
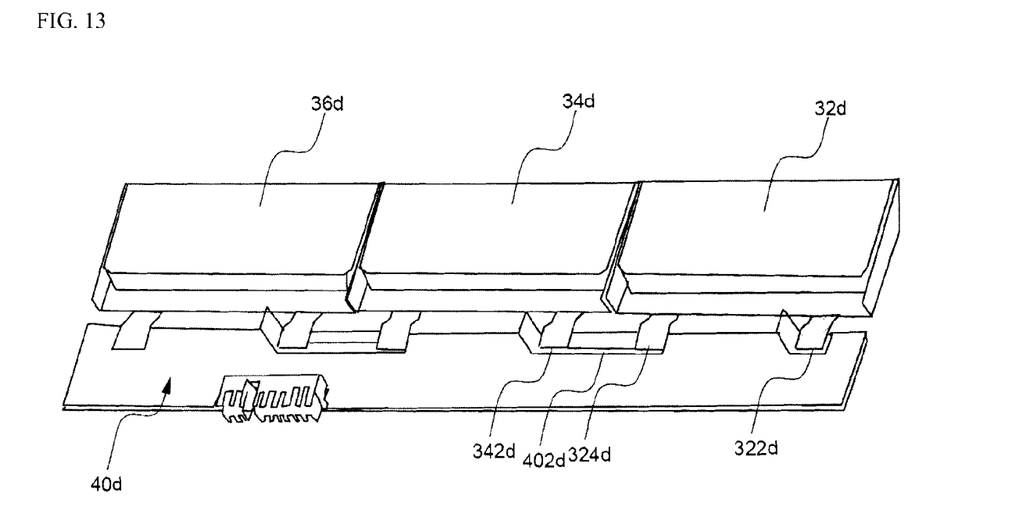
FIG. 13 is a partial perspective view showing a structure in which a plurality of pouch-shaped battery cells according to another embodiment of the present invention is electrically connected to each other.
Figure 14:
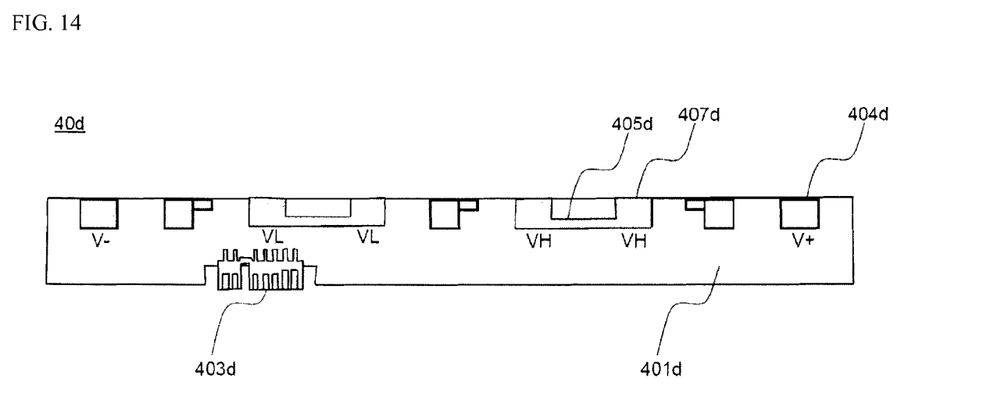
FIG. 14 is an enlarged plan view typically showing a protection circuit module (PCM) of FIG. 13.

FIG. 13 is a partial perspective view typically showing a structure in which a plurality of pouch-shaped battery cells according to another embodiment of the present invention is electrically connected to each other, and FIG. 14 is an enlarged plan view typically showing a protection circuit module (PCM) of FIG. 13.

Referring to these drawings, metal plates 402d to electrically connect battery cells 32d, 34d and 36d to each other are formed at the top of a protection circuit module 40d in a structure in which an anode terminal 324d of the first battery cell 32d is connected in series to a cathode terminal 342d of the second battery cell 34d.

Also, the protection circuit module 40d includes a PCM main body 401d having a protection circuit to control overcharge, overdischarge and overcurrent, connection terminals 404d and 407d formed at positions of the PCM main body 401d corresponding to the electrode terminals of the battery cells 32d, 34d and 36d so as to directly electrically connect the battery cells 32d, 34d and 36d to each other, metal plates 405d formed at the top of the PCM main body 401d to electrically connect the connection terminals 404d and 407d to each other, and an external input and output terminal 403d to input electric current to the battery pack, to output electric current from the battery pack, and to transmit and receive information, are mounted at the front of the PCM main body 401 in a depressed form.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

[Industrial Applicability]

As is apparent from the above description, the battery pack according to the present invention includes three or fewer battery cells, each of which has a current capacity of 3 amperes or more, electrically connected in series to each other in a state in which the battery cells are arranged in the lateral direction so as to provide high capacity. Consequently, it is possible to manufacture a high capacity battery pack without using a parallel connection structure and, at the same time, to greatly reduce a defect rate due to voltage unbalance between the battery cells when the battery cells are connected in parallel to each other.

Also, the protection circuit module does not include an element to adjust voltage unbalance between the battery cells. Consequently, it is possible to manufacture a battery pack using a simple and easy method and to reduce the number of parts constituting the battery pack, thereby greatly reducing manufacturing costs.

The invention claimed is:

1. A battery pack comprising:
    (a) a battery cell array comprising three or fewer battery cells, each of which has an electrode assembly of a cathode/separator/anode structure disposed in a battery case together with an electrolyte in a sealed state, arranged in a lateral direction, the battery cells having a current capacity of 3 amperes (Ah) or more and being electrically connected in series to each other;
    (b) a protection circuit module (PCM) connected to an upper end of the battery cell array to control an operation of the battery pack, the protection circuit module comprising a protection circuit, from which a function to adjust voltage unbalance between the battery cells is removed;
    (c) a pack case in which the battery cell array and the protection circuit module are disposed; and
    (d) a spacer mounted between the pack case and the battery cell array to provide a space accommodating an increase in thickness of the battery cell array during charging and discharging of the battery pack, wherein the pack case comprises a lower case at which the battery cell array and the protection circuit module are disposed and an upper case to cover the lower case so as to fix the battery cell array and the protection circuit module in place, the lower case is partitioned into a battery cell mounting part, at which the battery cells are disposed, and a protection circuit module mounting part, at which the protection circuit module is disposed, and a partition wall is formed at an interface between the battery cell mounting part and the protection circuit module mounting part, the partition wall including openings through which electrode terminals of the battery cells are exposed toward the protection circuit module, the openings being formed at portions of the partition wall corresponding to electrical connection regions between the electrode terminals of the battery cells and the protection circuit module.

2. The battery pack according to claim 1, wherein the battery cells are electrically connected in series to each other in a 1 parallel (P)-2 series (S) structure or in a 1P-3S structure.

3. The battery pack according to claim 1, wherein the spacer has a thickness equivalent to 5 to 10% of a thickness of the battery cell array.

4. The battery pack according to claim 1, wherein the pack case is formed of a plastic material, and the spacer is formed of a sheet member or a plastic material.

5. The battery pack according to claim 4, wherein the spacer is provided at a top or bottom thereof with an adhesive, by which the spacer is bonded to an outer side of the battery cell array.

6. The battery pack according to claim 1, wherein the spacer is mounted to tops and bottoms of the battery cells at two or more edges thereof in a state in which the spacer has a predetermined width.

7. The battery pack according to claim 1, wherein the protection circuit module comprises connection terminals connected to electrode terminals of the battery cells by resistance welding, metal plates to electrically connect the battery cells to each other, and a protection circuit to control the operation of the battery pack.

8. The battery pack according to claim 7, wherein the metal plates to electrically connect the battery cells to each other are formed at a top of the protection circuit module.

9. The battery pack according to claim 7, wherein electrical connection regions between cathode terminals of the battery cells and the protection circuit module are configured to have a structure in which conductive plates attached to tops of the respective connection terminals of the protection circuit module are welded so that the conductive plates wrap the respective cathode terminals of the battery cells.

10. The battery pack according to claim 9, wherein each of the conductive plates comprises a first connection part attached to the top of a corresponding one of the connection terminals of the protection circuit module and a second connection part attached to a top of the cathode terminal of a corresponding one of the battery cells.

11. The battery pack according to claim 10, wherein each of the conductive plates is a nickel plate, and each of the cathode terminals of the battery cells is an aluminum terminal.

12. The battery pack according to claim 1, wherein the protection circuit module mounting part comprises support parts to support the electrical connection regions between the electrode terminals of the battery cells and the protection circuit module.

13. The battery pack according to claim 1, wherein each of the battery cells is a pouch-shaped secondary battery.

14. The battery pack according to claim 1, wherein an external input and output terminal, which input electric current to the battery pack, output electric current from the battery pack, and transmit and receive information, are mounted at a front of the protection circuit module in a depressed form.

15. A laptop computer comprising the battery pack according to claim 1 as a power source.

* * * * *